US008326621B2

(12) United States Patent
Hetherington et al.

(10) Patent No.: US 8,326,621 B2
(45) **Date of Patent: *Dec. 4, 2012**

(54) REPETITIVE TRANSIENT NOISE REMOVAL

(75) Inventors: Phillip A. Hetherington, Port Moody (CA); Shreyas A. Paranjpe, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/307,615

(22) Filed: Nov. 30, 2011

(65) Prior Publication Data

US 2012/0076315 A1 Mar. 29, 2012

Related U.S. Application Data

(63) Continuation of application No. 11/331,806, filed on Jan. 13, 2006, now Pat. No. 8,073,689, which is a continuation-in-part of application No. 11/252,160, filed on Oct. 17, 2005, now Pat. No. 7,725,315, which is a continuation-in-part of application No. 11/006,935, filed on Dec. 8, 2004, now Pat. No. 7,949,522, which is a continuation-in-part of application No. 10/688,802, filed on Oct. 16, 2003, now Pat. No. 7,895,036, which is a continuation-in-part of application No. 10/410,736, filed on Apr. 10, 2003, now Pat. No. 7,885,420.

(60) Provisional application No. 60/449,511, filed on Feb. 21, 2003.

(51) Int. Cl.
*G10L 15/20* (2006.01)
*G10L 21/02* (2006.01)

(52) U.S. Cl. ......... 704/233; 704/205; 704/211; 704/226

(58) Field of Classification Search .................. 704/205, 704/211, 226, 233
See application file for complete search history.

(56) References Cited

U.S. PATENT DOCUMENTS 4,486,900 A 12/1984 Cox et al.
(Continued)

FOREIGN PATENT DOCUMENTS

CA 2158847 9/1994
(Continued)

OTHER PUBLICATIONS

European Search Report for Application No. 04003675.8-2218, dated May 12, 2004.

(Continued)

*Primary Examiner* — Jialong He
(74) *Attorney, Agent, or Firm* — Brinks Hofer Gilson & Lione

(57) ABSTRACT

A system improves the perceptual quality of a speech signal by dampening undesired repetitive transient noises. The system includes a repetitive transient noise detector adapted to detect repetitive transient noise in a received signal. The received signal may include a harmonic and a noise spectrum. The system further includes a repetitive transient noise attenuator that substantially removes or dampens repetitive transient noises from the received signal. The method of dampening the repetitive transient noises includes modeling characteristics of repetitive transient noises; detecting characteristics in the received signal that correspond to the modeled characteristics of the repetitive transient noises; and substantially removing components of the repetitive transient noises from the received signal that correspond to some or all of the modeled characteristics of the repetitive transient noises.

21 Claims, 12 Drawing Sheets

U.S. PATENT DOCUMENTS

| | | | | |
|---|---|---|---|---|
| 4,531,228 | A | 7/1985 | Noso et al. | |
| 4,630,304 | A | 12/1986 | Borth et al. | |
| 4,630,305 | A | 12/1986 | Borth et al. | |
| 4,811,404 | A | 3/1989 | Vilmur et al. | |
| 4,843,562 | A | 6/1989 | Kenyon et al. | |
| 4,845,466 | A | 7/1989 | Hariton et al. | |
| 4,959,865 | A | 9/1990 | Stettiner et al. | |
| 5,012,519 | A | 4/1991 | Adlersberg et al. | |
| 5,027,410 | A | 6/1991 | Williamson et al. | |
| 5,056,150 | A | 10/1991 | Yu et al. | |
| 5,140,541 | A * | 8/1992 | Sakata et al. | 708/322 |
| 5,146,539 | A | 9/1992 | Doddington et al. | |
| 5,251,263 | A | 10/1993 | Andrea et al. | |
| 5,313,555 | A | 5/1994 | Kamiya | |
| 5,400,409 | A | 3/1995 | Linhard | |
| 5,426,703 | A | 6/1995 | Hamabe et al. | |
| 5,426,704 | A | 6/1995 | Tamamura et al. | |
| 5,442,712 | A | 8/1995 | Kawamura et al. | |
| 5,479,517 | A | 12/1995 | Linhard | |
| 5,485,522 | A | 1/1996 | Solve et al. | |
| 5,495,415 | A | 2/1996 | Ribbens et al. | |
| 5,499,189 | A | 3/1996 | Seitz | |
| 5,502,688 | A | 3/1996 | Recchione et al. | |
| 5,526,466 | A | 6/1996 | Takizawa | |
| 5,550,924 | A | 8/1996 | Helf et al. | |
| 5,568,559 | A | 10/1996 | Makino | |
| 5,574,824 | A | 11/1996 | Slyh et al. | |
| 5,584,295 | A | 12/1996 | Muller et al. | |
| 5,586,028 | A | 12/1996 | Sekine et al. | |
| 5,617,508 | A | 4/1997 | Reaves | |
| 5,651,071 | A | 7/1997 | Lindemann et al. | |
| 5,677,987 | A | 10/1997 | Seki et al. | |
| 5,680,508 | A | 10/1997 | Liu | |
| 5,692,104 | A | 11/1997 | Chow et al. | |
| 5,701,344 | A | 12/1997 | Wakui | |
| 5,708,754 | A * | 1/1998 | Wynn | 704/219 |
| 5,727,072 | A | 3/1998 | Raman | |
| 5,752,226 | A | 5/1998 | Chan et al. | |
| 5,757,937 | A | 5/1998 | Itoh et al. | |
| 5,809,152 | A | 9/1998 | Nakamura et al. | |
| 5,839,101 | A | 11/1998 | Vahatalo et al. | |
| 5,859,420 | A | 1/1999 | Borza | |
| 5,878,389 | A | 3/1999 | Hermansky et al. | |
| 5,920,834 | A | 7/1999 | Sih et al. | |
| 5,933,495 | A | 8/1999 | Oh | |
| 5,933,801 | A | 8/1999 | Fink et al. | |
| 5,949,888 | A | 9/1999 | Gupta et al. | |
| 5,950,154 | A | 9/1999 | Medaugh et al. | |
| 5,982,901 | A | 11/1999 | Kane et al. | |
| 6,011,853 | A | 1/2000 | Koski et al. | |
| 6,108,610 | A | 8/2000 | Winn | |
| 6,122,384 | A | 9/2000 | Mauro | |
| 6,122,610 | A * | 9/2000 | Isabelle | 704/226 |
| 6,130,949 | A | 10/2000 | Aoki et al. | |
| 6,163,608 | A | 12/2000 | Romesburg et al. | |
| 6,167,375 | A | 12/2000 | Miseki et al. | |
| 6,173,074 | B1 | 1/2001 | Russo | |
| 6,175,602 | B1 | 1/2001 | Gustafsson et al. | |
| 6,192,134 | B1 | 2/2001 | White et al. | |
| 6,199,035 | B1 | 3/2001 | Lakaniemi et al. | |
| 6,208,268 | B1 | 3/2001 | Scarzello et al. | |
| 6,230,123 | B1 | 5/2001 | Mekuria et al. | |
| 6,252,969 | B1 | 6/2001 | Ando | |
| 6,289,309 | B1 | 9/2001 | deVries | |
| 6,405,168 | B1 | 6/2002 | Bayya et al. | |
| 6,415,253 | B1 | 7/2002 | Johnson | |
| 6,434,246 | B1 | 8/2002 | Kates et al. | |
| 6,449,594 | B1 * | 9/2002 | Hwang et al. | 704/233 |
| 6,453,285 | B1 | 9/2002 | Anderson et al. | |
| 6,507,814 | B1 | 1/2003 | Gao | |
| 6,510,408 | B1 | 1/2003 | Hermansen | |
| 6,587,816 | B1 | 7/2003 | Chazan et al. | |
| 6,615,170 | B1 | 9/2003 | Liu et al. | |
| 6,643,619 | B1 | 11/2003 | Linhard et al. | |
| 6,647,365 | B1 * | 11/2003 | Faller | 704/200.1 |
| 6,687,669 | B1 | 2/2004 | Schrögmeier et al. | |
| 6,711,536 | B2 | 3/2004 | Rees | |
| 6,741,873 | B1 | 5/2004 | Doran et al. | |
| 6,766,292 | B1 | 7/2004 | Chandran et al. | |
| 6,768,979 | B1 | 7/2004 | Menendez-Pidal et al. | |
| 6,782,363 | B2 | 8/2004 | Lee et al. | |
| 6,822,507 | B2 | 11/2004 | Buchele | |
| 6,859,420 | B1 | 2/2005 | Coney et al. | |
| 6,882,736 | B2 | 4/2005 | Dickel et al. | |
| 6,910,011 | B1 | 6/2005 | Zakarauskas | |
| 6,937,980 | B2 | 8/2005 | Krasny et al. | |
| 6,959,276 | B2 | 10/2005 | Droppo et al. | |
| 7,043,030 | B1 | 5/2006 | Furuta | |
| 7,047,047 | B2 | 5/2006 | Acero et al. | |
| 7,062,049 | B1 | 6/2006 | Inoue et al. | |
| 7,072,831 | B1 | 7/2006 | Etter | |
| 7,092,877 | B2 | 8/2006 | Ribic | |
| 7,117,145 | B1 | 10/2006 | Venkatesh et al. | |
| 7,117,149 | B1 | 10/2006 | Zakarauskas | |
| 7,139,701 | B2 * | 11/2006 | Harton et al. | 704/217 |
| 7,158,932 | B1 | 1/2007 | Furuta | |
| 7,165,027 | B2 | 1/2007 | Kellner et al. | |
| 7,313,518 | B2 | 12/2007 | Scalart et al. | |
| 7,373,296 | B2 | 5/2008 | Van Der Par et al. | |
| 7,386,217 | B2 | 6/2008 | Zhang | |
| 2001/0028713 | A1 | 10/2001 | Walker | |
| 2002/0037088 | A1 | 3/2002 | Dickel et al. | |
| 2002/0071573 | A1 | 6/2002 | Finn | |
| 2002/0094100 | A1 | 7/2002 | Kates et al. | |
| 2002/0094101 | A1 | 7/2002 | De Roo et al. | |
| 2002/0152066 | A1 * | 10/2002 | Piket | 704/226 |
| 2002/0176589 | A1 | 11/2002 | Buck et al. | |
| 2002/0193130 | A1 * | 12/2002 | Yang et al. | 455/501 |
| 2003/0040908 | A1 | 2/2003 | Yang et al. | |
| 2003/0115055 | A1 * | 6/2003 | Gong | 704/233 |
| 2003/0147538 | A1 | 8/2003 | Elko | |
| 2003/0151454 | A1 | 8/2003 | Buchele | |
| 2003/0216907 | A1 | 11/2003 | Thomas | |
| 2004/0019417 | A1 * | 1/2004 | Yasui et al. | 701/36 |
| 2004/0078200 | A1 | 4/2004 | Alves | |
| 2004/0093181 | A1 | 5/2004 | Lee | |
| 2004/0138882 | A1 | 7/2004 | Miyazawa | |
| 2004/0161120 | A1 | 8/2004 | Petersen et al. | |
| 2004/0165736 | A1 | 8/2004 | Hetherington et al. | |
| 2004/0167777 | A1 | 8/2004 | Hetherington et al. | |
| 2005/0114128 | A1 | 5/2005 | Hetherington et al. | |
| 2005/0238283 | A1 | 10/2005 | Faure et al. | |
| 2005/0240401 | A1 | 10/2005 | Ebenezer | |
| 2006/0009970 | A1 * | 1/2006 | Harton et al. | 704/231 |
| 2006/0034447 | A1 | 2/2006 | Alves et al. | |
| 2006/0074646 | A1 | 4/2006 | Alves et al. | |
| 2006/0100868 | A1 | 5/2006 | Hetherington et al. | |
| 2006/0115095 | A1 | 6/2006 | Glesbrecht et al. | |
| 2006/0136199 | A1 | 6/2006 | Nongpiur et al. | |
| 2006/0251268 | A1 | 11/2006 | Hetherington et al. | |
| 2006/0287859 | A1 | 12/2006 | Hetherington et al. | |
| 2007/0019835 | A1 | 1/2007 | Ivo de Roo et al. | |
| 2007/0033031 | A1 | 2/2007 | Zakarauskas | |

FOREIGN PATENT DOCUMENTS

| | | | |
|---|---|---|---|
| CA | 2157496 | | 10/1994 |
| CA | 2158064 | | 10/1994 |
| CN | 1325222 | A | 12/2001 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 1 450 353 | A1 | 8/2004 |
| EP | 1 450 354 | A1 | 8/2004 |
| EP | 1 669 983 | A1 | 6/2006 |
| JP | 64-039195 | | 2/1989 |
| JP | 06269084 | | 9/1994 |
| JP | 6 282 297 | | 10/1994 |
| JP | 06319193 | | 11/1994 |
| JP | 6 349 208 | | 12/1994 |
| JP | 2001-215992 | | 8/2001 |
| WO | WO 00-41169 | A1 | 7/2000 |
| WO | WO 0156255 | A1 | 8/2001 |
| WO | WO 01-73761 | A1 | 10/2001 |

OTHER PUBLICATIONS

Avendano, C., Hermansky, H., "Study on the Dereverberation of Speech Based on Temporal Envelope Filtering," Proc. ICSLP '96, pp. 889-892, Oct. 1996.
Berk et al.; "Data Analysis with Microsoft Excel"; Duxbury Press, 1998; pp. 236-239 and 256-259.
Boll; "Suppression of Acoustic Noise in Speech Using Spectral Substraction"; IEEE Trans. On Acoustics, Speech, and Signal Processing; Apr. 1979.
Ephraim, Y., "Statistical-Model-Based Speech Enhancement Systems," *IEEE*, vol. 80, No. 10, 1992, pp. 1526-1555.
Fiori, S., Uncini, A., and Piazza, F., "Blind Deconvolution by Modified Bussgang Algorithm", Dept. of Electronics and Automatics—University of Ancona (Italy), ISCAS 1999.
Godsill, S. et al., "Digital Audio Restoration," Department of Engineering, University of Cambridge, 1997, pp. 1-71.
Learned, R.E. et al., A Wavelet Packet Approach to Transient Signal Classification, Applied and Computational Harmonic Analysis, Jul. 1995, pp. 265-278, vol. 2, No. 3, USA, XP 000972660. ISSN: 1063-5203. abstract.
Ljung, L., Chapter 1, "Introduction," *System Identification Theory for the User*, 2nd ed., Prentice Hall, Upper Saddle River, New Jersey, Copyright 1999, pp. 1-14.
Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.
Pellom, B. et al., "An Improved (Auto:I, LSP:T) Constrained Iterative Speech Enhancement for Colored Noise Environments," *IEEE Trans. On Speech and Audio Processing*, vol. 6, No. 6, 1998, pp. 573-579.
Puder, H. et al., "Improved Noise Reduction for Hands-Free Car Phones Utilizing Information on Vehicle and Engine Speeds", Sep. 4-8, 2000, pp. 1851-1854, vol. 3, XP009030255, 2000, Tampere, Finland, Tampere Univ. Technology, Finland Abstract.
Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.
Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.
Seely, S.; "An Introduction to Engineering Systems"; Pergamon Press Inc.; 1972; pp. 7-10.
Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.
Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.
Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.
Udrea, R. M. et al., "Speech Enhancement Using Spectral Over-Subtraction and Residual Noise Reduction," IEEE, 2003, pp. 165-168.
Vaseghi, S., "Advanced Digital Signal Processing and Noise Reduction," Publisher, John Wiley & Sons Ltd., 2000, Chapter 12, pp. 354-377.
Vaseghi, S., "Advanced Digital Signal Processing and Noise Reduction," Publisher, John Wiley & Sons Ltd., 2000.
Vieira, J., "Automatic Estimation of Reverberation Time", Audio Engineering Society, Convention Paper 6107, 116th Convention, May 8-11, 2004, Berlin, Germany, pp. 1-7.
Wahab A. et al., "Intelligent Dashboard With Speech Enhancement", Information, Communications and Signal Processing, 1997. ICICS, Proceedings of 1997 International Conference on Singapore, Sep. 9-12, 1997, New York, NY, USA, IEEE, pp. 993-997.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.

* cited by examiner

REPETITIVE TRANSIENT NOISE REMOVAL

PRIORITY CLAIM

This application is a continuation of U.S. application Ser. No. 11/331,806 "Repetitive Transient Noise Removal," filed Jan. 13, 2006, now U.S. Pat. No. 8,073,689 which is a continuation-in-part of U.S. application Ser. No. 11/252,160 "Minimization of Transient Noises in a Voice Signal," filed Oct. 17, 2005, now U.S. Pat. No. 7,725,315 which is a continuation-in-part of U.S. application Ser. No. 11/006,935 "System for Suppressing Rain Noise," filed Dec. 8, 2004, now U.S. Pat. No. 7,949,522 which is a continuation-in-part of U.S. application Ser. No. 10/688,802 "System for Suppressing Wind Noise," filed Oct. 16, 2003, now U.S. Pat. No. 7,895,036 which is a continuation-in-part of U.S. application Ser. No. 10/410,736, "Method and Apparatus for Suppressing Wind Noise," filed Apr. 10, 2003, now U.S. Pat. No. 7,885,420 which claims priority to U.S. Application No. 60/449,511, "Method for Suppressing Wind Noise" filed on Feb. 21, 2003, each of which are incorporated herein by reference.

BACKGROUND OF THE INVENTION

1. Technical Field

This invention relates to acoustics, and more particularly, to a system that enhances the quality of a conveyed voice signal.

2. Related Art

Communication devices may acquire, assimilate, and transfer voice signals. In some systems, the clarity of the voice signals depends on the quality of the communication system, communication medium, and the accompanying noise. When noise occurs near a source or a receiver, distortion may garble the signals and destroy information. In some instances, the noise masks the signals making them unrecognizable to a listener or a voice recognition system.

Noise originates from many sources. In a vehicle noise may be created by an engine or a movement of air or by tires moving across a road. Some noises are characterized by their short duration and repetition. The spectral shapes of these noises may be characterized by a gradual rise in signal intensity between a low and a mid frequency followed by a peak and a gradual tapering off at a higher frequency that is then repeated. Other repetitive transient noises have different spectral shapes. Although repetitive transient noises may have differing spectral shapes, each of these repetitive transient noises may mask speech. Therefore, there is a need for a system that detects and dampens repetitive transient noises.

SUMMARY

A system improves the perceptual quality of a speech signal by dampening undesired repetitive transient noises. The system comprises a repetitive transient noise detector adapted to detect repetitive transient noise in a received signal that comprises a harmonic and a noise spectrum. A repetitive transient noise attenuator substantially removes or dampens repetitive transient noises from the received signal.

A method of dampening the repetitive transient noises comprises modeling characteristics of repetitive transient noises; detecting characteristics in a signal that correspond to the modeled characteristics of the repetitive transient noises; and substantially removing components of the repetitive transient noises from the signal that correspond to some or all of the modeled characteristics of the repetitive transient noises.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A voice enhancement system improves the perceptual quality of a voice signal. The system analyzes aural signals to detect repetitive transient noises within a device or structure for transporting persons or things (e.g., a vehicle). These noises may occur naturally (e.g., wind passing across a surface) or may be man made (e.g., clicking sound of a turn signal, the swishing sounds of windshield wipers, etc.). When detected, the system substantially eliminates or dampens the repetitive transient noises. Repetitive transient noises may be attenuated in real-time, near real-time, or after a delay, such as a buffering delay (e.g., of about 300-500 ms). Some systems also dampen or substantially remove continuous noises, such as background noise, and/or noncontinuous noises that may be of short duration and of relatively high amplitude (e.g., such as an impulse noise). Some systems may also eliminate the "musical noise," squeaks, squawks, clicks, drips, pops, tones, and other sound artifacts generated by some voice enhancement systems.

Figure 1:
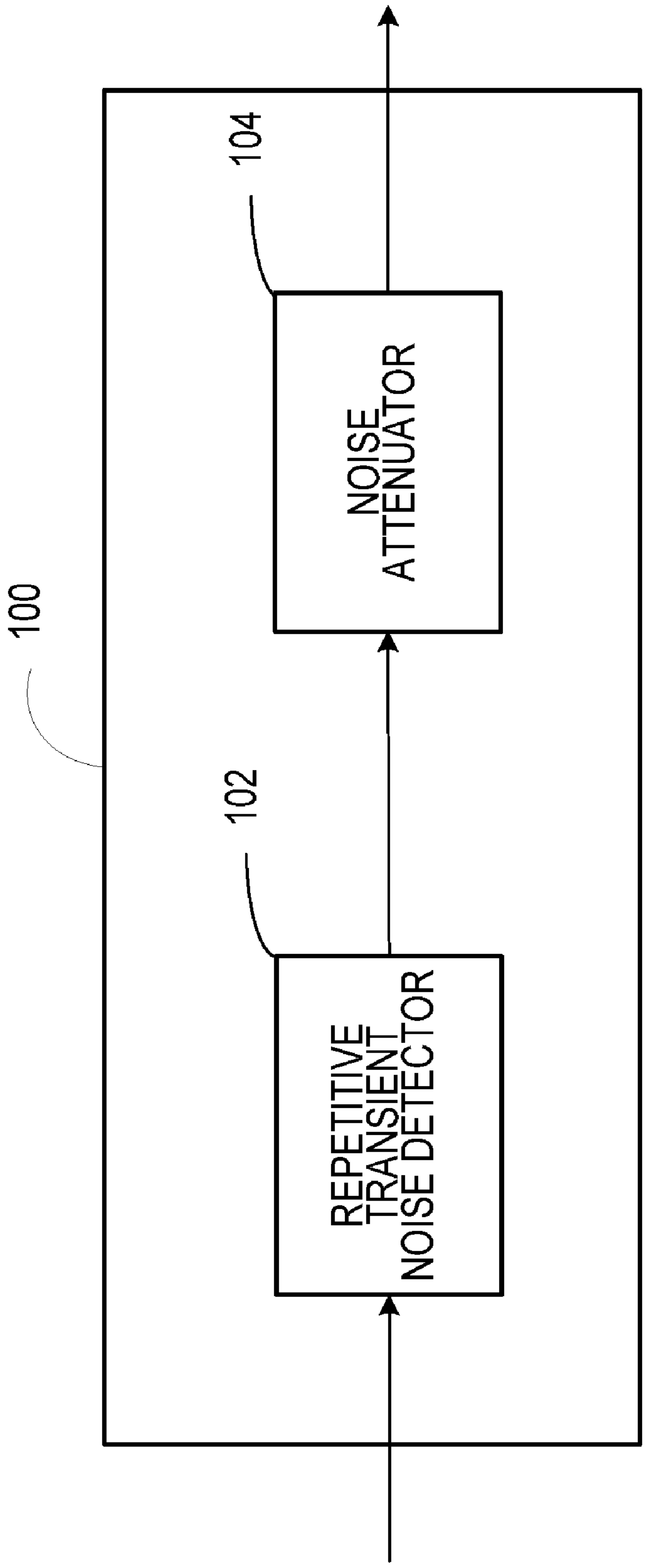
FIG. 1 is a partial block diagram of a voice enhancement system.

FIG. 1 is a partial block diagram of a voice enhancement system 100. The voice enhancement system 100 may encompass dedicated hardware and/or software that may be executed by one or more processors that run on one or more operating systems. The voice enhancement system 100 includes a repetitive transient noise detector 102 and a noise attenuator 104. In FIG. 1, an aural signal is analyzed to determine whether the signal includes a repetitive transient noise. When identified, the repetitive transient noise may be removed.

Some repetitive transient noises have temporal and frequency characteristics that may be analyzed or modeled. Some repetitive transient noise detectors 102 detect these noises by identifying attributes that are common to repetitive transient noises or by comparing the aural signals to modeled repetitive transient noises. When repetitive transient noises are detected, a noise attenuator 104 substantially removes or dampens the repetitive transient noises.

In FIG. 1, the noise attenuator 104 may comprise a neural network mapping of repetitive transient noises; a system that subtracts repetitive transient noise from the received signal; a system that selects a noise-reduced signal from one or more code books based on an estimated or measured repetitive transient noise; and/or a system that generate a noise-reduced signal by other systems or processes. In some systems, the noise attenuator 104 may attenuate continuous or noncontinuous noise that may be a part of the short term spectra of the received signal. Some noise attenuators 104 also interface or include a residual attenuator (not shown) that removes sound artifacts such as the "musical noise", squeaks, squawks, chirps, clicks, drips, pops, tones or others that may result from the attenuation or removal of the repetitive transient noise.

The repetitive transient noise detector 102 may separate the noise-like segments from the remaining signal in real-time, near real-time, or after a delay. The repetitive transient noise detector 102 may separate the periodic or near periodic (e.g., quasi-periodic) noise segments regardless of the amplitude or complexity of the received signal. When some repetitive transient noise detectors 102 detect a repetitive transient noise, the repetitive transient noise detectors 102 model the temporal and spectral characteristics of the detected repetitive transient noise. The repetitive transient noise detector 102 may retain the entire model of the repetitive transient noise, or may store selected attributes in an internal or remote memory. A plurality of repetitive transient noise models may create an average repetitive transient noise model, or a plurality of attributes may be combined to detect and/or remove the repetitive transient noise.

Figure 2:
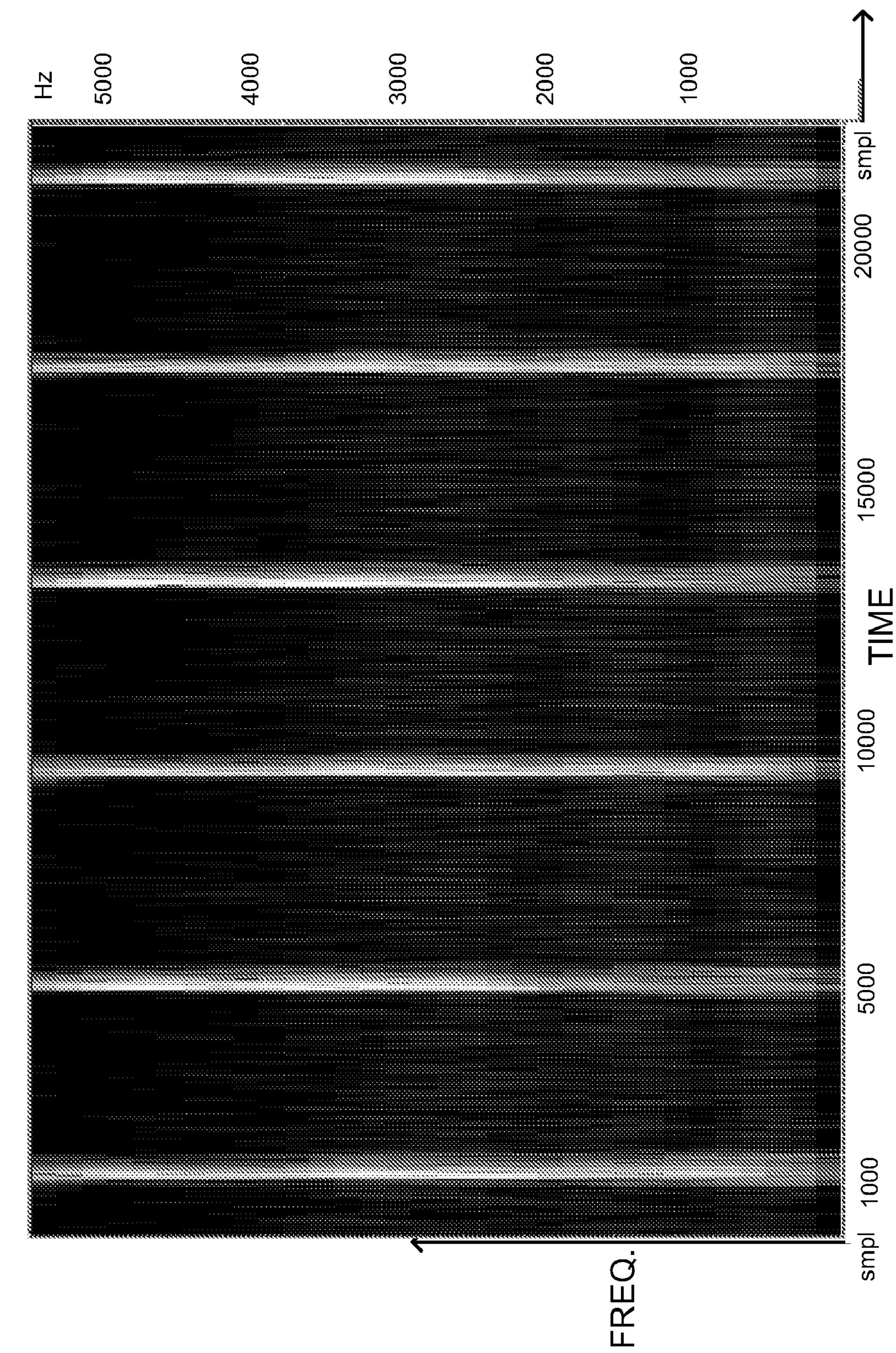
FIG. 2 is a spectrogram of representative repetitive transient noises.

FIG. 2 is a spectrogram of representative repetitive transient noises. Six transients are shown substantially equally spaced in time. The transients share a substantially similar spectral shape that repeat at a nearly periodic rate. While many transients may occur for a short period of time, such as when a device automatically switches a device off and on such as a lamp or wipers in a vehicle, other representative repetitive transients that may be dampened or substantially removed may occur regularly and frequently and may have many other and different spectral shapes.

Figure 3:
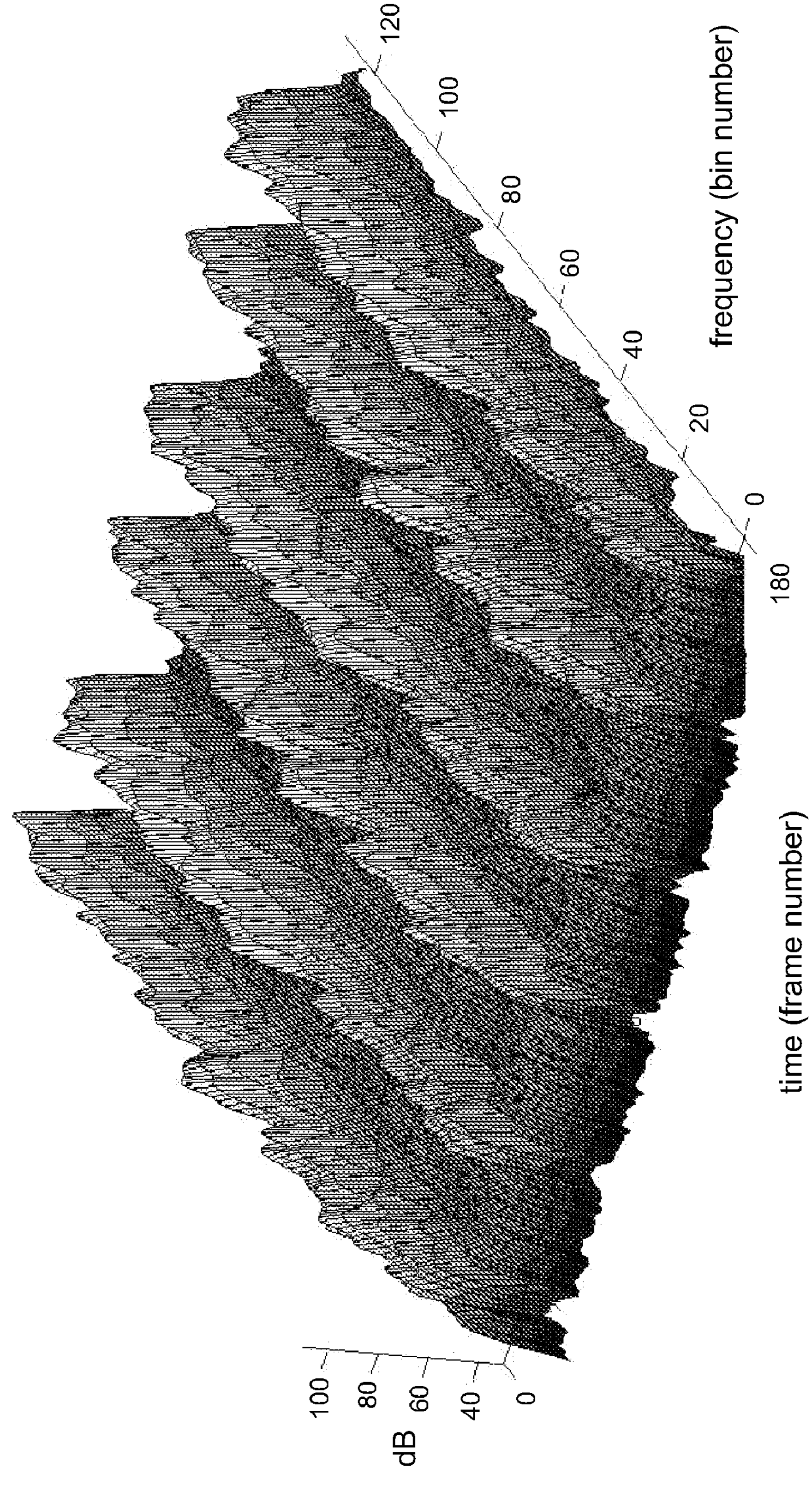
FIG. 3 is a plot of the repetitive transient noises of FIG. 2.

FIG. 3 is a plot of the representative repetitive transient noise of FIG. 2. In this three dimensional plot, the horizontal axis represents time or a frame number, the vertical axis represent decibels and the axis extending from the front to the back represents frequency. The repetitive transient noise is measured across about a 5.5 kHz range. In time the repetitive transient noise are substantially equally spaced apart. In frequency, the repetitive transient noise extends across a broadband, gradually increasing in amplitude at the low and mid frequency range before gradual tapering off at higher frequencies. While some repetitive transient noises may be nearly identical, others are not as shown in the spectral structure of the signals in FIG. 2.

Some repetitive transient noise detectors 102 identify noise events that are likely to be repetitive transient noises based on their temporal and spectral structures. Using a weighted average, leaky integrator, or some other adaptive modeling technique, the repetitive transient noise detector 102 may estimate or measures the temporal spacing of repetitive transient noises. The frequency response may also be estimated or measured. In FIG. 2, the repetitive transient noise is characterized by a gradual rise in signal intensity between the low and mid frequencies, followed by a peak intensity and a gradual tapering off at a higher frequency. When the repetitive transient noise detector 102 identifies a repetitive transient noise, the repetitive transient noise detector 102 may look forward or backward in time to identify a second signal having substantially the same or similar characteristics.

Figure 4:
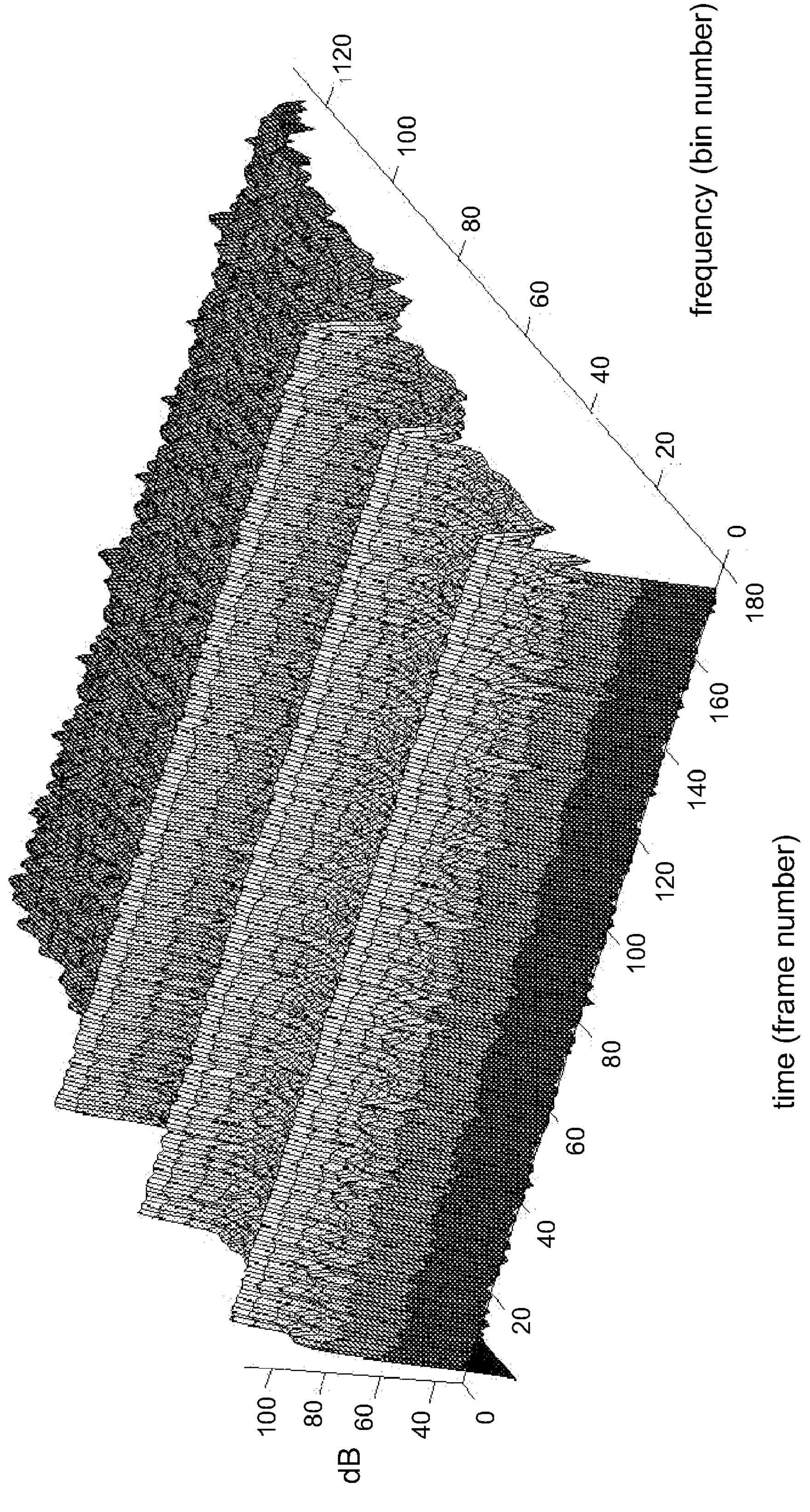
FIG. 4 is a partial plot of an illustrative voice signal.

FIG. 4 is a partial plot of an illustrative idealized voice signal. Multiple time intervals are arrayed along the horizontal time axis; frequency intervals are arrayed along the frequency axis; and signal magnitude is arrayed along the vertical axis. The idealized voiced signal (e.g., shown as an idealized pronunciation of a vowel) includes a combination of harmonic spectrum and background noise spectrum fairly stable in time. In this plot, the harmonic components are more prominent at the low frequencies, while the background noise component is more prominent at high frequencies. While shown across a small bandwidth, the harmonic and noise components may also appear across a large bandwidth (e.g., such as a broadband) and in the alternative have different characteristics. Some voice signals may have a high amplitude at lower frequencies that tapers off gradually at high frequencies.

Figure 5:
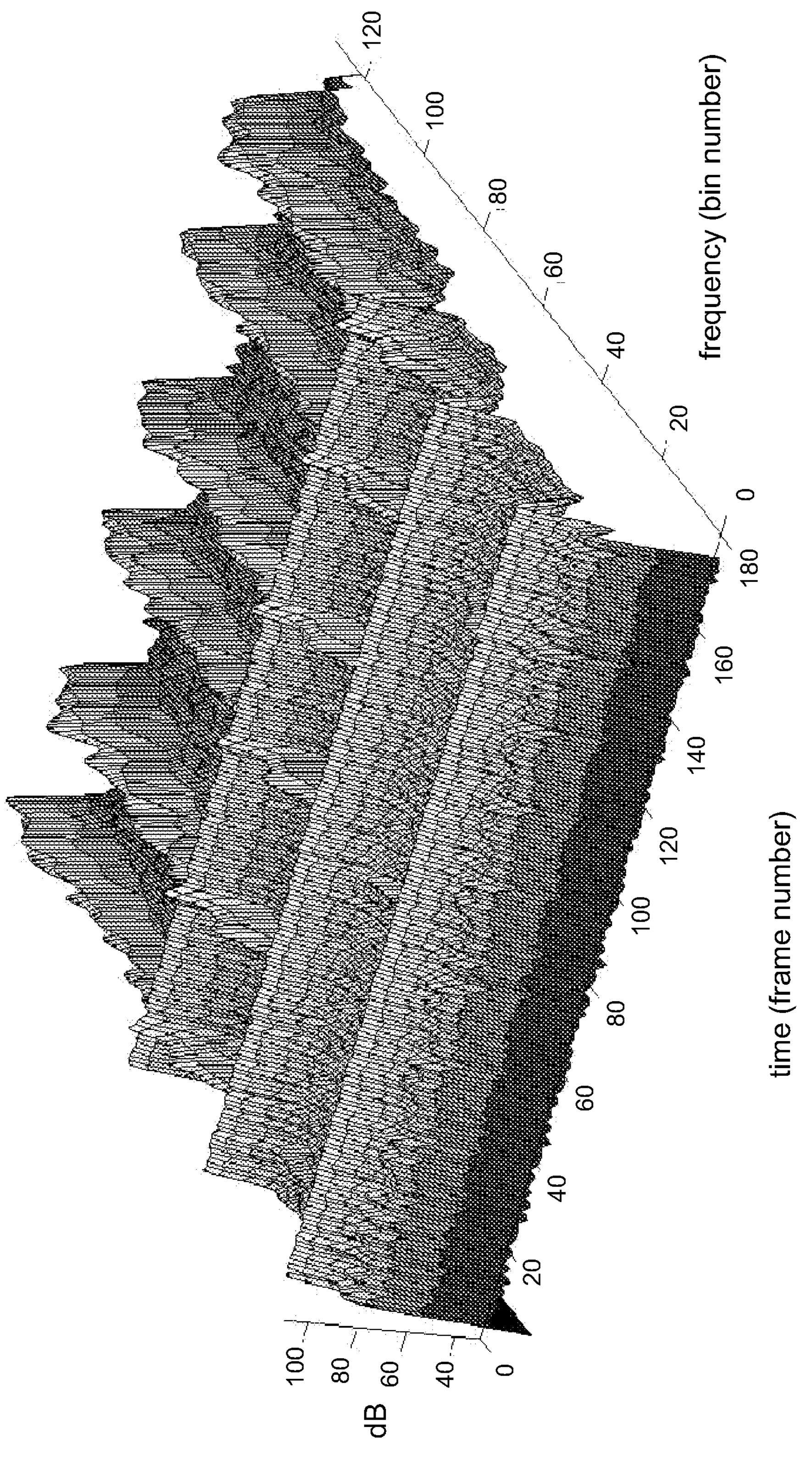
FIG. 5 is a partial plot of the voice signal of FIG. 4 in the presence of the repetitive transient noises of FIG. 2.

FIG. 5 is a partial plot of the voice signal of FIG. 4 in the presence of the repetitive transient noises of FIG. 2. In FIG. 5, the repetitive transient noise partially masks some of the spectral structure of the spoken vowel. Because of the periodicity or quasi-periodicity of the respective signals, the temporal and spectral shapes of the voice signal and repetitive transient noise may be identified.

When repetitive transient noises are identified, they may be substantially removed, attenuated, or dampened by the repetitive transient noise attenuator 104. Many methods may be used to substantially remove, attenuate, or dampen the repetitive transient noises. One method adds a repetitive transient noise model to an estimated or measured background noise signal. In the power spectrum, repetitive transient noise and continuous background noise measurements or estimates may be subtracted from a received signal. If a portion of the underlying speech signal is masked by a repetitive transient noise, a conventional or modified stepwise interpolator may reconstruct the missing portion of the signal. An inverse Fast Fourier Transform (FFT) may then convert the reconstructed signal to the time domain.

Figure 6:
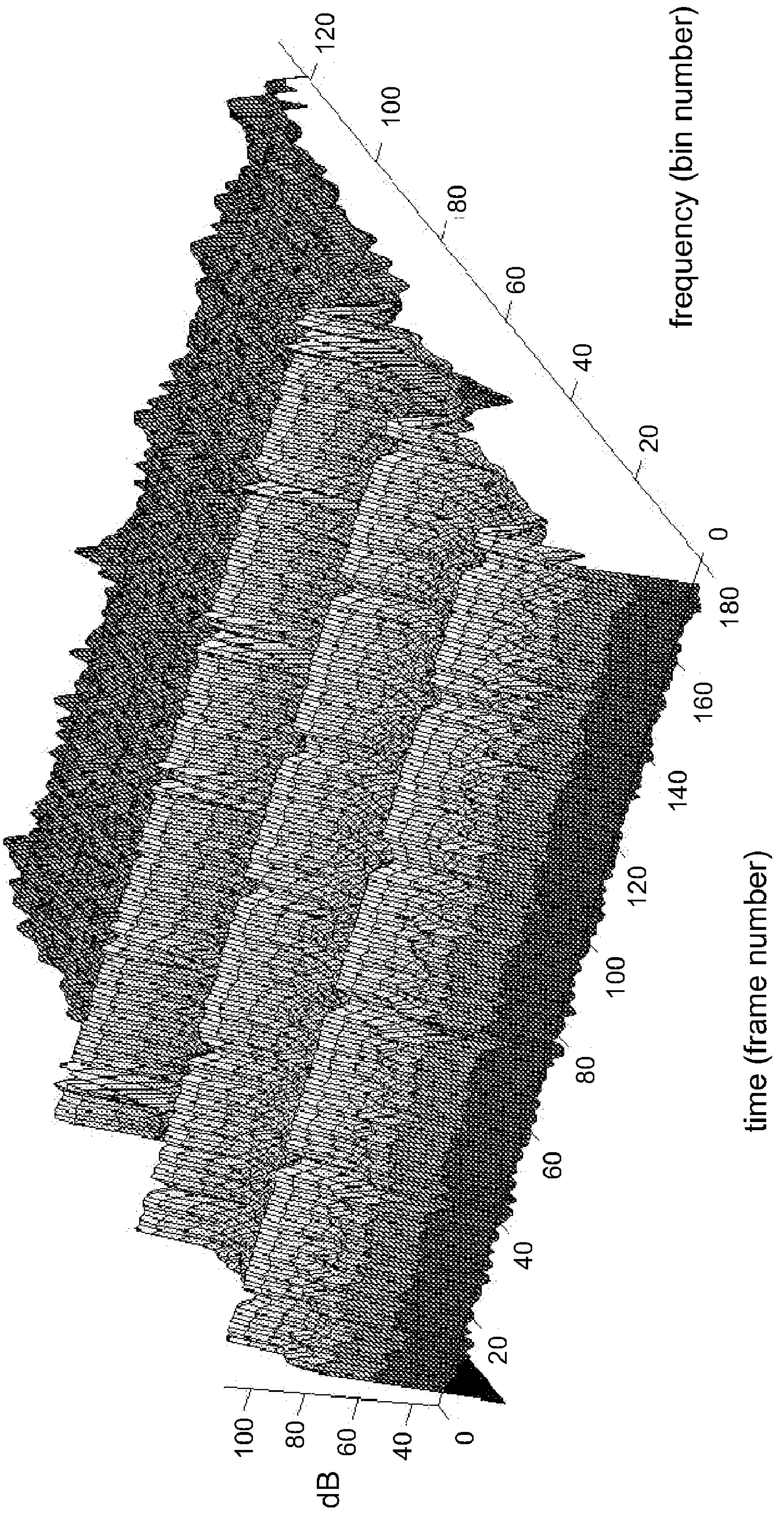
FIG. 6 is a plot of the voice signal of FIG. 5 with the repetitive transient noise of FIG. 2 substantially dampened.
Figure 7:
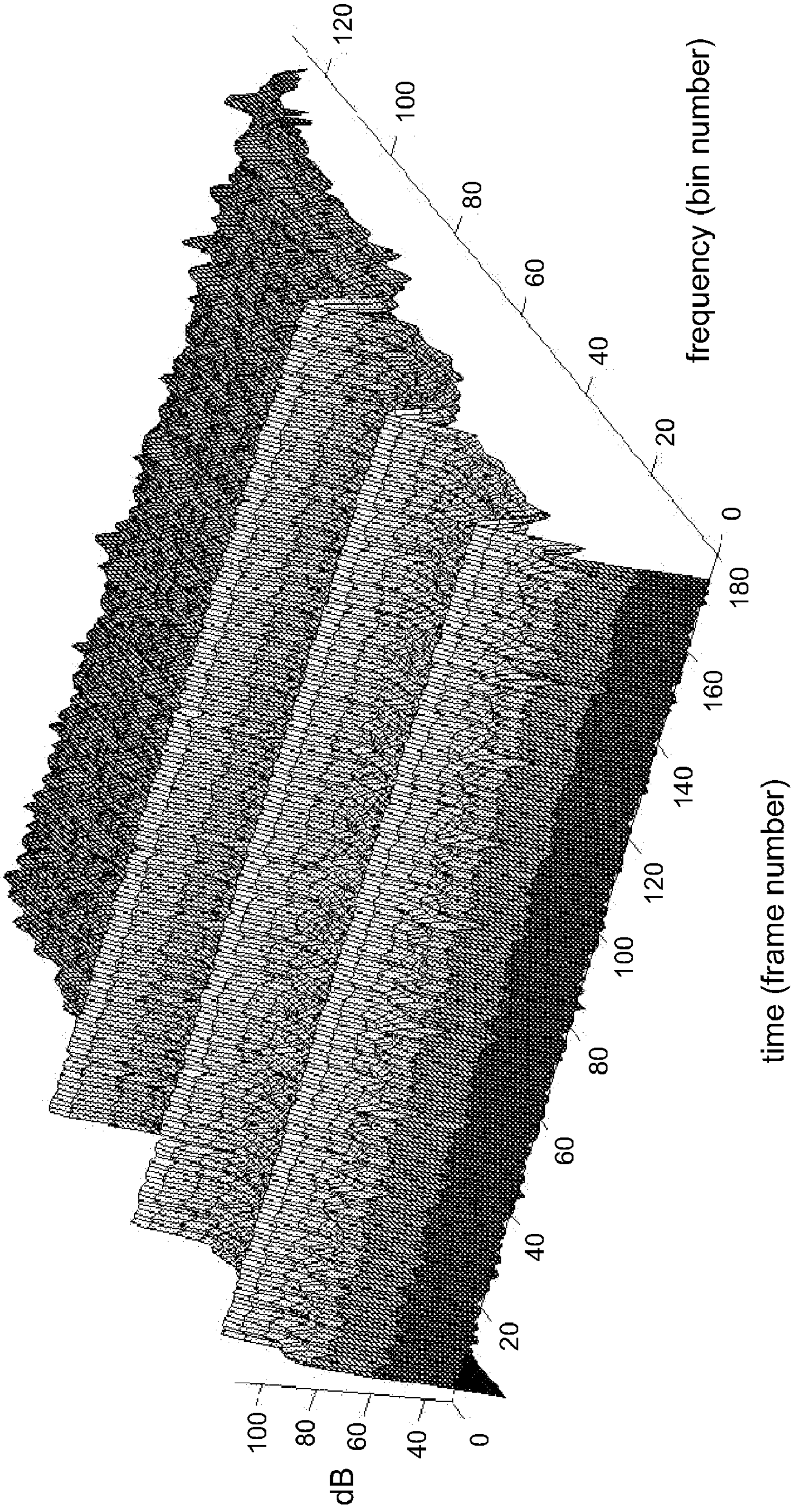
FIG. 7 is a partial plot of the voice signal of FIG. 6 with portions of the voice signal reconstructed.

FIG. 6 is a plot of the voice signal of FIG. 5 after the repetitive transient noise of FIG. 2 is dampened. While portions of the harmonic structure that was masked by the repetitive transient noise shown in FIG. 5 were attenuated, long-term correlation in the spectral structure and/or short term correlation in the spectral envelope of the voice signal may be used to reconstruct portions of the voice signal. In FIG. 7 portions of the voice signal were reconstructed through a linear step-wise interpolator. While the voice signal is substantially similar to the voice signal shown in FIG. 6, the attenuated voiced segments may also be replaced by a different signal with a different structure and similar spectral envelope so that the perceived quality of the reconstructed signal does not drop.

Figure 8:
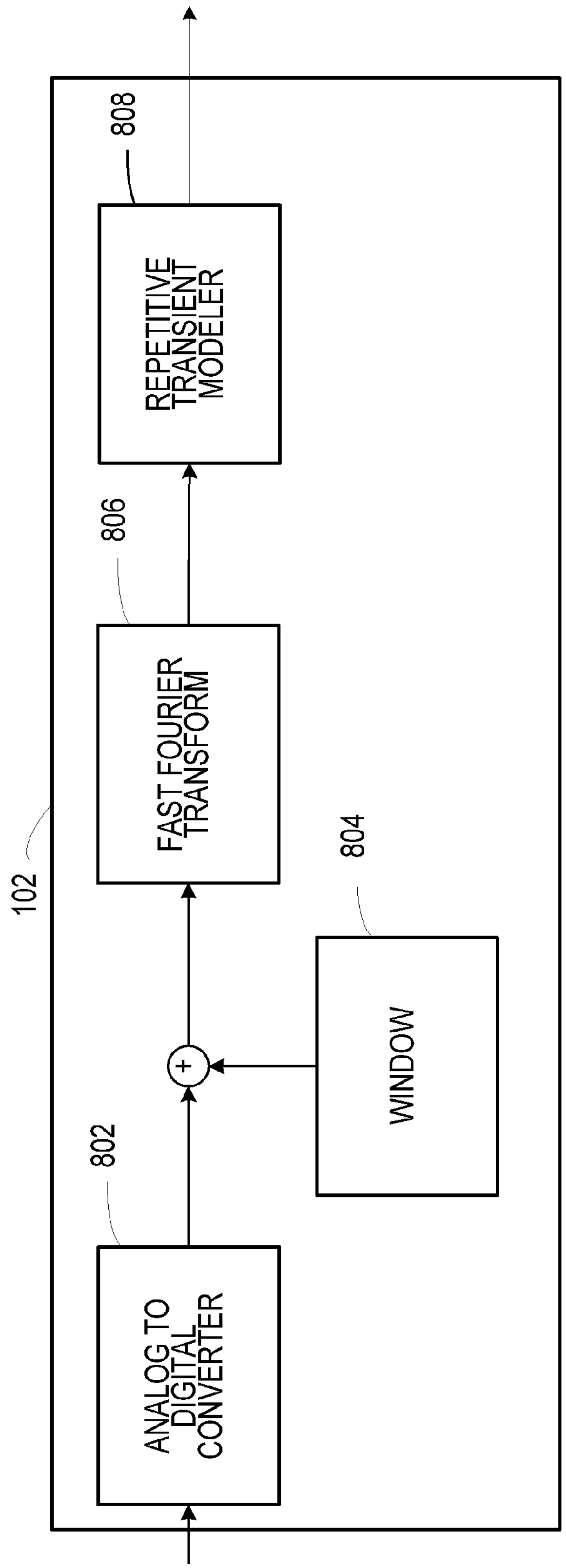
FIG. 8 is a representative repetitive transient noise detector.

FIG. 8 is a block diagram of a repetitive transient noise detector 102. The repetitive transient noise detector 102 receives or detects an input signal comprising speech, noise and/or a combination of speech and noise. The received or detected signal is digitized at a predetermined frequency. To assure a good quality voice, the voice signal is converted to a pulse-code-modulated (PCM) signal by an analog-to-digital converter 802 (ADC). A smoothing window function generator 804 generates a windowing function such as a Hanning window that is applied to blocks of data to obtain a windowed signal. The complex spectrum for the windowed signal may be obtained by means of an FFT 806 or other time-frequency transformation mechanism. The FFT separates the digitized signal into frequency bins, and calculates the amplitude of the various frequency components of the received signal for each frequency bin. The spectral components of the frequency bins may be monitored over time by a repetitive transient modeler 808.

There are multiple aspects to modeling repetitive transient noises in some voice enhancement systems. A first aspect may model one or many sound events that comprise the repetitive transient noise, and a second aspect may model the temporal space between the two sound events comprising a repetitive transient noise. A correlation between the spectral and/or temporal shape of a received signal and the modeled shape or between attributes of the received signal spectrum and the modeled attributes may identify a sound event as a repetitive transient noise. When a sound event is identified as a potential repetitive transient noise the repetitive transient noise modeler 808 may look back to previously analyzed time windows or forward to later received time windows, or forward and backward within the same time window, to determine whether a corresponding component of a repetitive transient noise was or will be received. If a corresponding sound event within an appropriate characteristic is received within an appropriate period of time, the sound event may be identified as a repetitive transient noise.

Alternatively or additionally, the repetitive transient noise modeler 808 may determine a probability that the signal includes repetitive transient noise, and may identify sound events as repetitive transient noise when a high correlation is found or when a probability exceeds a threshold. The correlation and probability thresholds may depend on varying factors, including the presence of other noises or speech within a received signal. When the repetitive transient noise detector 102 detects a repetitive transient noise, the characteristics of the detected repetitive transient noise may be sent to the repetitive transient noise attenuator 104 that may substantially remove or dampen the repetitive transient noise.

As more windows of sound are processed, the repetitive transient noise detector 102 may derive average noise models for repetitive transient noises and the temporal spacing between them. A time-smoothed or weighted average may be used to model repetitive transient noise events and the continuous noise sensed or estimated for each frequency bin. The average model may be updated when repetitive transient noises are detected in the absence of speech. Fully bounding a repetitive transient noise when updating the average model may increase accurate detections. A leaky integrator or a weighted average may model the interval between repetitive transient noise events.

To minimize the "music noise," squeaks, squawks, chirps, clicks, drips, pops, or other sound artifacts, an optional residual attenuator may condition the voice signal before it is converted to the time domain. The residual attenuator may be combined with the repetitive transient noise attenuator 104, combined with one or more other elements, or comprise a separate element.

A residual attenuator may track the power spectrum within a low frequency range (e.g., from about 0 Hz up to about 2 kHz). When a large increase in signal power is detected an improvement may be obtained by limiting or dampening the transmitted power in the low frequency range to a predetermined or calculated threshold. A calculated threshold may be substantially equal to, or based on, the average spectral power of that same low frequency range at an earlier period in time.

Figure 9:
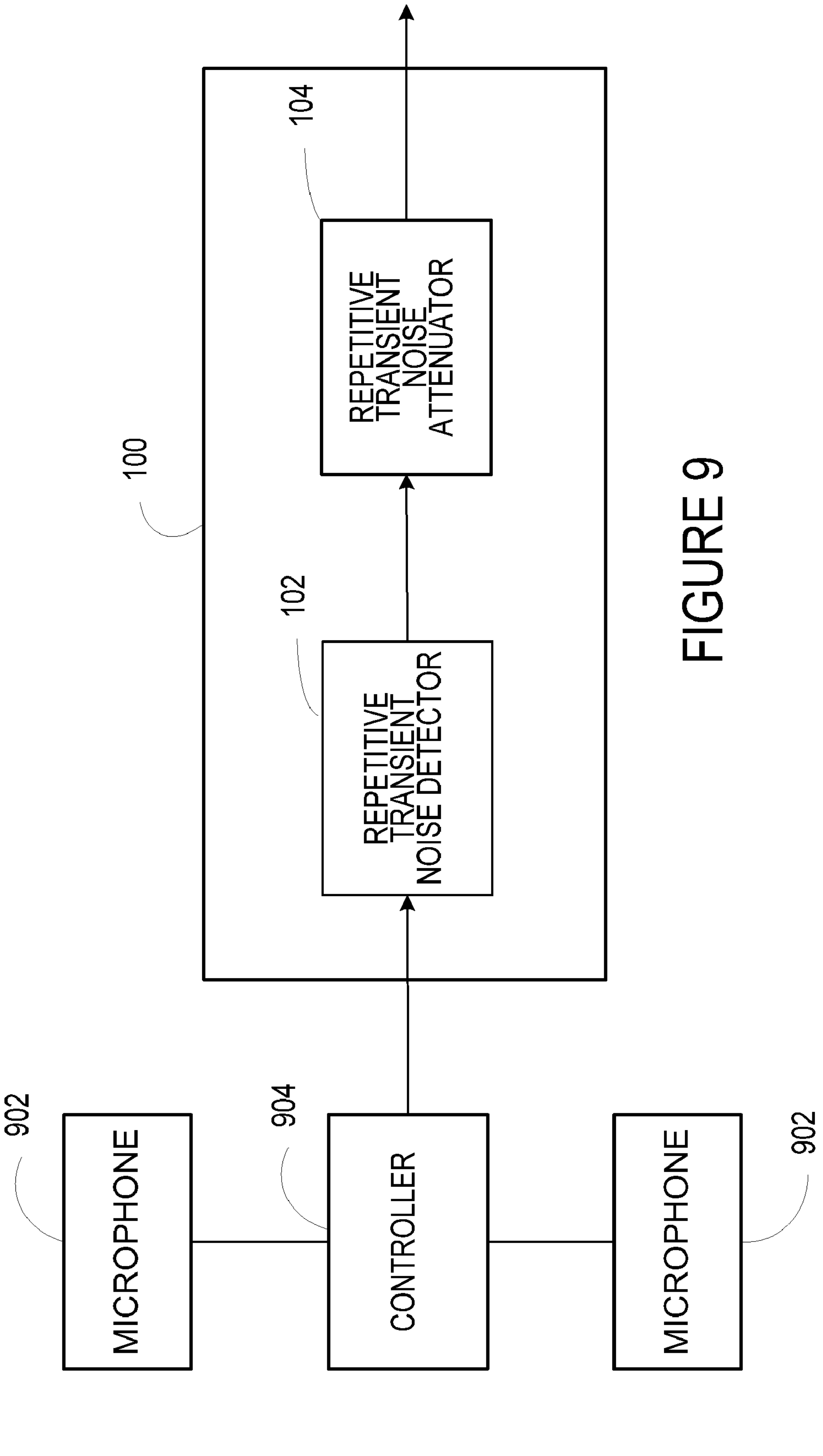
FIG. 9 is an alternate voice enhancement system.

Further changes in voice quality may be achieved by preconditioning the input signal before it is processed by the repetitive transient noise detector 102. One pre-processing system may exploit the lag time caused by a signal arriving at different times at different detectors that are positioned apart from on another as shown in FIG. 9. If multiple detectors or microphones 902 are used that convert sound into an electric signal, the pre-processing system may include a controller 904 that automatically selects the microphone 902 and channel that senses the least amount of noise. When another microphone 902 is selected, the signal may be combined with the previously generated signal before being processed by the repetitive transient noise detector 102.

Alternatively, repetitive transient noise detection may be performed on each of the channels coupled to the multiple detectors or microphones 902. A mixing of one or more channels may occur by switching between the outputs of the microphones 902. Alternatively or additionally, the controller 904 may include a comparator that detects the direction based on the differences in the amplitude of the signals or the time in which a signal is received from the microphones 902. Direction detection may be improved by positioning the microphones 902 in different directions.

Detected signals may be evaluated at frequencies above or below a predetermined threshold frequency through a high-pass or low pass filter, for example. The threshold frequency may be updated over time as the average repetitive transient noise model learns the frequencies of repetitive transient noises. When a vehicle is traveling at a higher speed, the threshold frequency for repetitive transient noise detection may be set relatively high, because the highest frequency of repetitive transient noises may increase with vehicle speed. Alternatively, controller 904 may combine the output signals of multiple microphones 902 at a specific frequency or frequency range through a weighting function.

Figure 10:
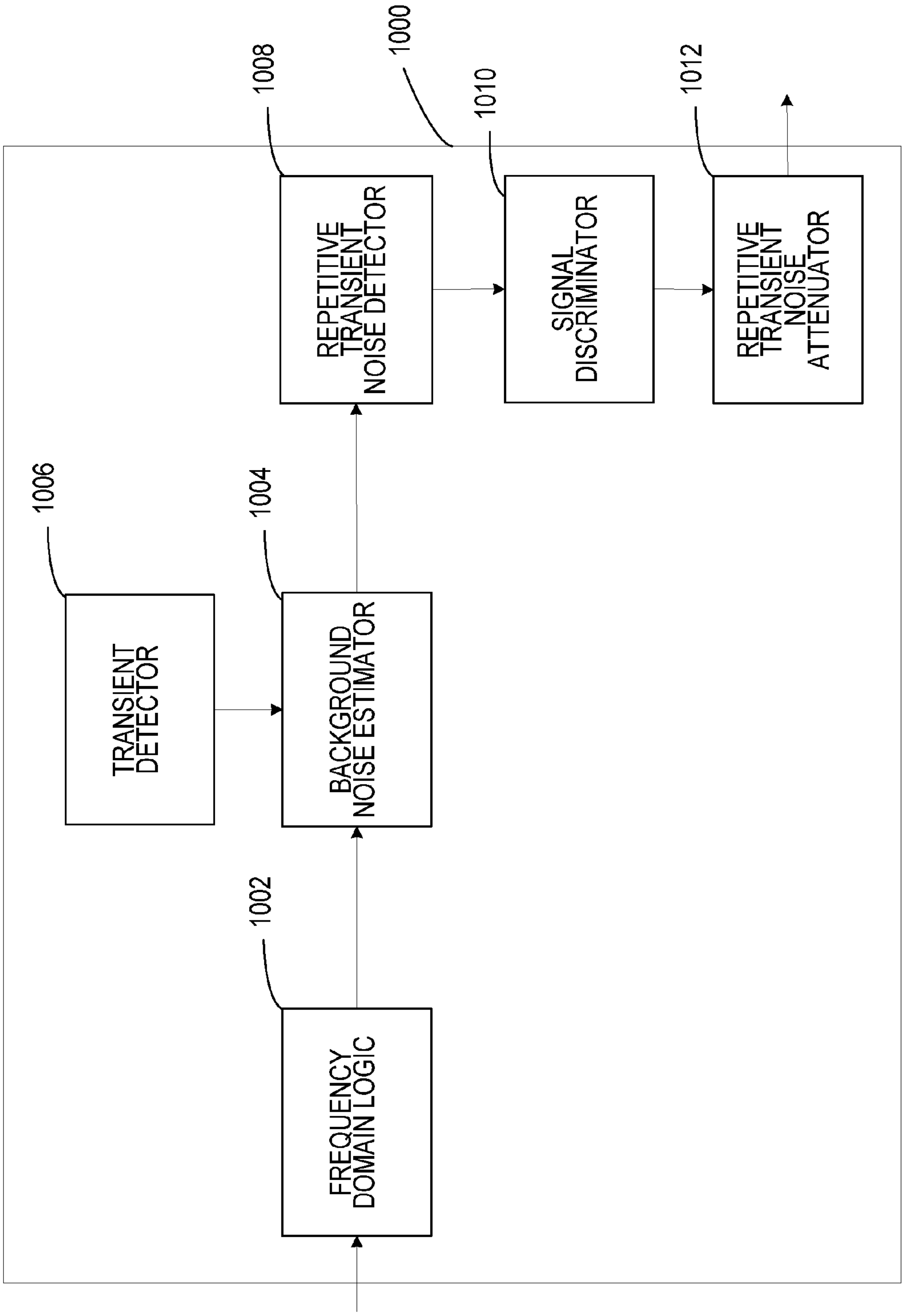
FIG. 10 is a second alternate voice enhancement system.

FIG. 10 is a second alternate voice enhancement system 1000. Time-frequency transform logic 1002 digitizes and converts a time varying signal to the frequency domain. A background noise estimator 1004 measures continuous, ambient, and/or background noise that occurs near a sound source or the receiver. The background noise estimator 1004 may comprise a power detector that averages the acoustic power in each frequency bin in the power, magnitude, or logarithmic domain. To prevent biased background noise estimations at or near transients, a transient detector 1006 may disable or modulate the background noise estimation process during abnormal or unpredictable increases in power. In FIG. 10, the transient detector 1006 disables the background noise estimator 1004 when an instantaneous background noise B(f, i) exceeds an average background noise B(f)Ave by more than a selected decibel level 'c.' This relationship may be expressed as:

$$B(f,i)>B(f)\mathrm{Ave}+c \qquad \text{Equation 1}$$

Alternatively or additionally, the average background noise may be updated depending on the signal to noise ratio (SNR). An example closed algorithm is one which adapts a leaky integrator depending on the SNR:

$$B(f)\mathrm{Ave}'=aB(f)\mathrm{Ave}+(1-a)S \qquad \text{Equation 2}$$

where a is a function of the SNR and S is the instantaneous signal. In this example, the higher the SNR, the slower the average background noise is adapted.

To detect a sound event that may correspond to a repetitive transient noise, the repetitive transient noise detector 1008 may fit a function to a selected portion of the signal in the time-frequency domain. A correlation between a function and the signal envelope in the time domain over one or more frequency bands may identify a sound event corresponding to a repetitive transient noise event. The correlation threshold at which a portion of the signal is identified as a sound event potentially corresponding to a repetitive transient noise may depend on a desired clarity of a processed voice and the variations in width and sharpness of the repetitive transient noise. Alternatively or additionally, the system may determine a probability that the signal includes a repetitive transient noise, and may identify a repetitive transient noise when that probability exceeds a probability threshold. The correlation and probability thresholds may depend on various factors, including the presence of other noises or speech in the input signal. When the noise detector 1008 detects a repetitive transient noise, the characteristics of the detected repetitive transient noise may be provided to the repetitive transient noise attenuator 1012 through the optional signal discriminator 1010 for substantially removing or dampening the repetitive transient noise.

A signal discriminator 1010 may mark the voice and noise of the spectrum in real, near real or delayed time. Any method may be used to distinguish voice from noise. Spoken signals may be identified by one or more of the following attributes: the narrow widths of their bands or peaks; the broad resonances, which are known as formants and are created by the vocal tract shape of the person speaking; the rate at which certain characteristics change with time (e.g., a time-frequency model may be developed to identify spoken signals based on how they change with time); and when multiple detectors or microphones are used, the correlation, differences, or similarities of the output signals of the detectors or microphones.

Figure 11:
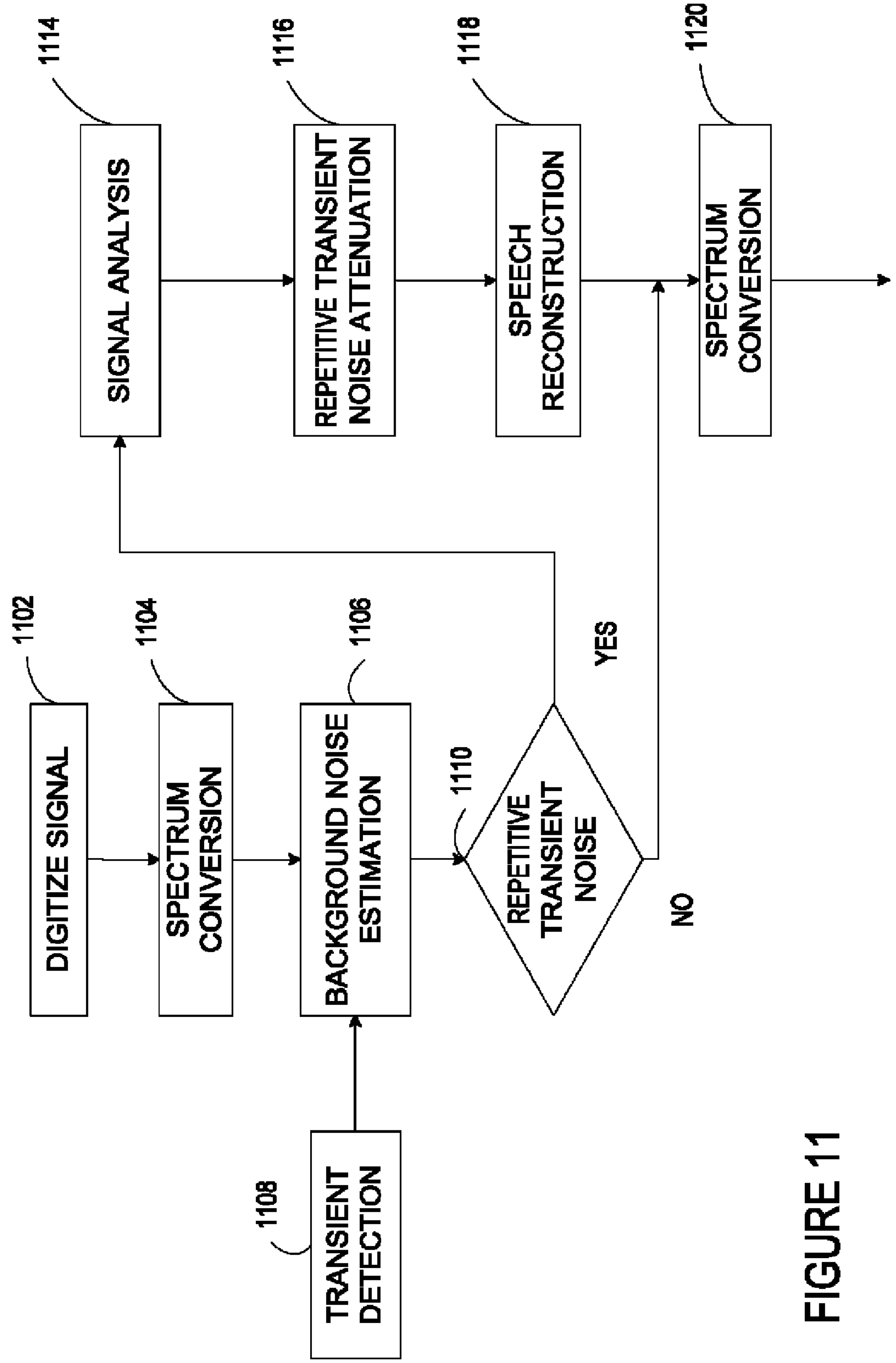
FIG. 11 is a process that removes repetitive transient noises from a voice or an aural signal.

FIG. 11 is a process that removes repetitive transient noises from a voice signal. At 1102 a received or detected signal is digitized at a predetermined frequency. To assure a good quality voice, the voice signal may be converted to a PCM signal by an ADC. At 1104 a complex spectrum for the windowed signal may be obtained by means of an FFT that separates the digitized signals into frequency bins, with each bin identifying an amplitude and phase across a small or limited frequency range.

At 1106, a continuous, ambient, and/or background noise estimate occurs. The background noise estimate may comprise an average of the acoustic power in each frequency bin. To prevent biased noise estimates at transients, the noise estimate process may be disabled during abnormal or unpredictable increases in power. The transient detection 1108 disables the background noise estimate when an instantaneous background noise exceeds an average background noise by more than a predetermined decibel level. At 1110 a repetitive transient noise may be detected when sound events consistent with a repetitive transient noise model are detected. The sound events may be identified by characteristics of their spectral shape or other attributes.

The detection of repetitive transient noises may be constrained in varying ways. For example, if a vowel or another harmonic structure is detected, the transient noise detection method may limit the transient noise correction to values less than or equal to average values. An alternate or additional method may allow the average repetitive transient noise model or attributes of the repetitive transient noise model, such as the spectral shape of the modeled sound events or the temporal spacing of the repetitive transient noises to be updated only during unvoiced speech segments. If a speech or speech mixed with noise segment is detected, the average repetitive transient noise model or attributes of the repetitive transient noise model may not be updated. If no speech is detected, the repetitive transient noise model may be updated through varying methods, such as through a weighted average or a leaky integrator.

If a repetitive transient noise is detected at 1110, a signal analysis may be performed at 1114 to discriminate or mark the spoken signal from the noise-like segments. Spoken signals may be identified by the narrow widths of their bands or peaks; the broad resonances, which are also known as formants and are created by the vocal tract shape of the person speaking; the rate at which certain characteristics change with time (e.g., a time-frequency model may be developed to identify spoken signals based on how they change with time); and when multiple detectors or microphones are used, the correlation, differences, or similarities of the output signals of the detectors or microphones.

To overcome the effects of repetitive transient noises, a repetitive noise is substantially removed or dampened from the noisy spectrum at 1116. One method adds a repetitive transient noise model to a monitored or modeled continuous noise. In the power spectrum, the modeled noise may then be substantially removed from the unmodified spectrum. If an underlying speech signal is masked by a repetitive transient noise, or masked by a continuous noise, a conventional or modified interpolation method may be used to reconstruct the speech signal at 1118. A time series synthesis may then be used to convert the signal power to the time domain at 1120. The result is a reconstructed speech signal from which the repetitive transient noise has been substantially removed or dampened. If no repetitive transient noise is detected at 1110, the signal may be converted directly into the time domain at 1120.

The method of FIG. 11 may be encoded in a signal bearing medium, a computer readable medium such as a memory, programmed within a device such as one or more integrated circuits, or processed by a controller or a computer. If the methods are performed by software, the software may reside in a memory resident to or interfaced to the repetitive transient noise detector 102, a communication interface, or any other type of non-volatile or volatile memory interfaced or resident to the voice enhancement system 100 or 1000. The memory may include an ordered listing of executable instructions for implementing logical functions. A logical function may be implemented through digital circuitry, through source code, through analog circuitry, through an analog source such as an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection “electronic” having one or more wires, a portable magnetic or optical disk, a volatile memory such as a Random Access Memory “RAM” (electronic), a Read-Only Memory “ROM” (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-described systems may condition signals received from only one or more than one microphone or detector. Many combinations of systems may be used to identify and track repetitive transient noises. Besides the fitting of a function to a sound suspected of being part of a repetitive transient noise, a system may detect and isolate any parts of a signal having energy greater than the modeled events. One or more of the systems described above may also interface or may be a unitary part of alternative voice enhancement logic.

Other alternative voice enhancement systems comprise combinations of the structure and functions described above. These voice enhancement systems are formed from any combination of structure and function described above or illustrated within the figures. The system may be implemented in software or hardware. The hardware may include a processor or a controller having volatile and/or non-volatile memory and may also comprise interfaces to peripheral devices through wireless and/or hardwire mediums.

Figure 12:
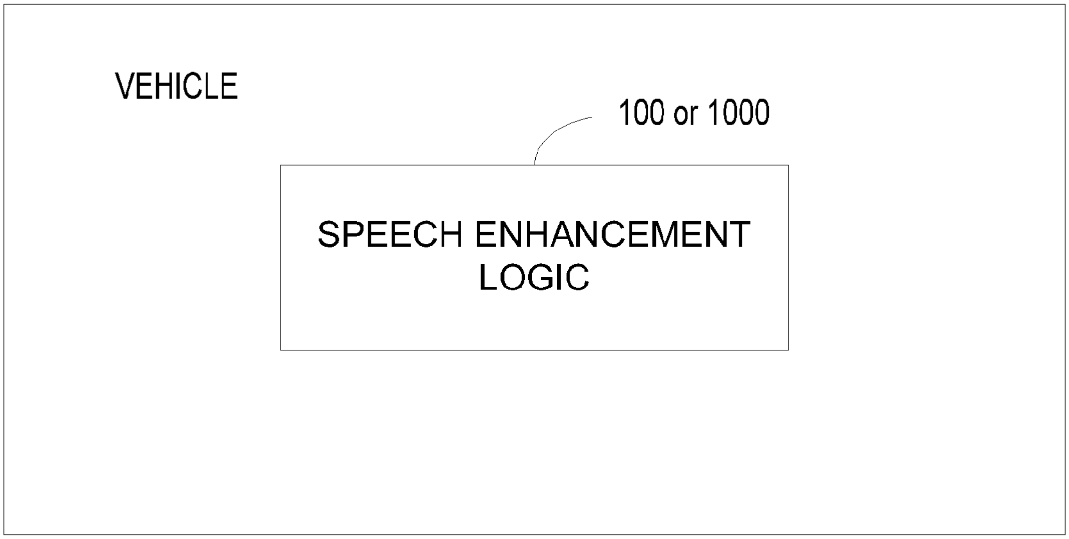
FIG. 12 is a block diagram of a voice enhancement system within a vehicle.
Figure 13:
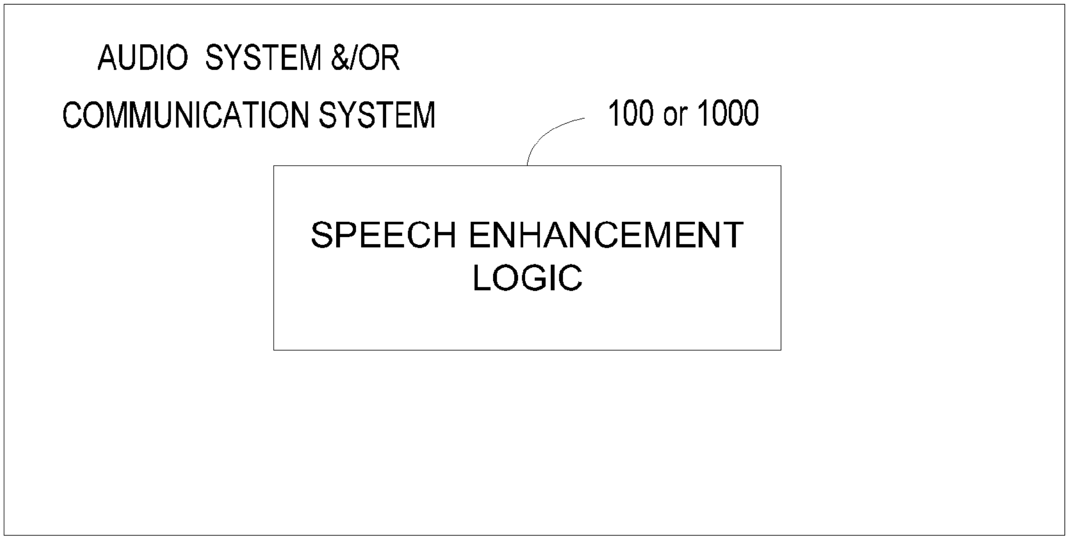
FIG. 13 is a block diagram of a voice enhancement system interfaced to an audio system and/or a navigation system and/or a communication system.

The voice enhancement system is easily adaptable to any technology or devices. Some voice enhancement systems or components interface or couple vehicles as shown in FIG. 12, instruments that convert voice and other sounds into a form that may be transmitted to remote locations, such as landline and wireless phones and audio systems as shown in FIG. 13, video systems, personal noise reduction systems, and other mobile or fixed systems that may be susceptible to transient noises. The communication systems may include portable analog or digital audio and/or video players (e.g., such as an iPod®), or multimedia systems that include or interface voice enhancement systems or retain voice enhancement logic or software on a hard drive, such as a pocket-sized ultra-light hard-drive, a memory such as a flash memory, or a storage media that stores and retrieves data. The voice enhancement systems may interface or may be integrated into wearable articles or accessories, such as eyewear (e.g., glasses, goggles, etc.) that may include wire free connectivity for wireless communication and music listening (e.g., Bluetooth stereo or aural technology) jackets, hats, or other clothing that enables or facilitates hands-free listening or hands-free communication.

The voice enhancement system improves the perceptual quality of a processed voice. The software and/or hardware logic may automatically learn and encode the shape and form of the noise associated with repetitive transient noise in real time, near real time or after a delay. By tracking selected attributes, the system may eliminate, substantially eliminate, or dampen repetitive transient noise using a limited memory that temporarily or permanently stores selected attributes of the repetitive transient noise. Some voice enhancement system may also dampen a continuous noise and/or the squeaks, squawks, chirps, clicks, drips, pops, tones, or other sound artifacts that may be generated within some voice enhancement systems and may reconstruct voice when needed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for attenuating repetitive transient noise, comprising:

a repetitive transient noise detector configured to determine whether an aural signal includes a repetitive transient noise based on a comparison between the aural signal and a repetitive transient noise model, where the repetitive transient noise detector comprises a processor configured to perform the comparison by fitting the repetitive transient noise model to the aural signal in a time-frequency domain, and where the repetitive transient noise detector is configured to identify the repetitive transient noise as being repetitive based on a correlation between a temporal shape of the aural signal and a temporal shape of the repetitive transient noise model, and a correlation between a spectral shape of the aural signal and a spectral shape of the repetitive transient noise model; and a repetitive transient noise attenuator responsive to the repetitive transient noise detector and configured to attenuate the repetitive transient noise identified in the aural signal and generate a noise-reduced aural signal.

2. The system of claim 1, where the repetitive transient noise identified in the aural signal is a first repetitive transient noise, and where the repetitive transient noise detector is configured to detect a second repetitive transient noise based on a comparison between a signal and the repetitive transient noise model updated based on the one or more characteristics of the first repetitive transient noise.

3. The system of claim 1, where the repetitive transient noise detector is configured to model temporal and spectral characteristics of the repetitive transient noise identified in the aural signal.

4. The system of claim 1, where the repetitive transient noise detector is configured to update a spectral shape of the repetitive transient noise model based on spectral characteristics of the repetitive transient noise identified in the aural signal.

5. The system of claim 1, where the repetitive transient noise detector is configured to update a temporal spacing of the repetitive transient noise model based on temporal characteristics of the repetitive transient noise identified in the aural signal.

6. The system of claim 1, where the repetitive transient noise model comprises an average repetitive transient noise model created from a plurality of repetitive transient noise models.

7. The system of claim 1, where the repetitive transient noise detector is configured to update the repetitive transient noise model in response to a detection of the repetitive transient noise in an absence of speech.

8. The system of claim 1, where the repetitive transient noise detector is configured to update the repetitive transient noise model through a leaky integrator.

9. The system of claim 1, where the repetitive transient noise detector is configured to update the repetitive transient noise model based on one or more characteristics of the repetitive transient noise in response to an identification of the repetitive transient noise in the aural signal, and where the repetitive transient noise detector is configured to prevent an update to the repetitive transient noise model when a speech or speech mixed with noise segment is detected.

10. The system of claim 1, where the repetitive transient noise attenuator is constrained, in response to a detection of a vowel or another harmonic structure, to limit a transient noise correction to a value less than or equal to an average value.

11. The system of claim 1, where the repetitive transient noise detector is configured with a threshold frequency above or below which the repetitive transient noise detector evaluates signals, and where the repetitive transient noise detector is configured to update the threshold frequency over time as the repetitive transient noise model learns frequencies of repetitive transient noises.

12. The system of claim 1, where the repetitive transient noise detector is configured with a threshold frequency above or below which the repetitive transient noise detector evaluates signals, where the repetitive transient noise detector is located within a vehicle, and where the repetitive transient noise detector is configured to set the threshold frequency based on a speed of the vehicle.

13. A method of attenuating repetitive transient noise, comprising:

detecting whether a transient noise of an aural signal is repetitive based on a comparison between the aural signal and a repetitive transient noise model by fitting the repetitive transient noise model to the aural signal in a time-frequency domain;

identifying the transient noise as being repetitive based on a correlation between a temporal shape of the aural signal and a temporal shape and spectral shapes of the repetitive transient noise model, and a correlation between a spectral shape of the aural signal and a spectral shape of the repetitive transient noise model; and attenuating the repetitive transient noise identified in the aural signal to generate a noise-reduced aural signal.

14. The method of claim 13, where the repetitive transient noise identified in the aural signal is a first repetitive transient noise, the method further comprising:

detecting a second repetitive transient noise based on a comparison between a signal and the repetitive transient noise model updated based on the one or more characteristics of the first repetitive transient noise.

15. The method of claim 13, further comprising updating a spectral shape of the repetitive transient noise model based on one or more spectral characteristics of the transient noise in response to an identification that the transient noise is repetitive.

16. The method of claim 13, further comprising updating a temporal spacing of the repetitive transient noise model based on one or more temporal characteristics of the transient noise in response to an identification that the transient noise is repetitive.

17. The method of claim 13, further comprising creating the repetitive transient noise model as an average repetitive transient noise model from a plurality of repetitive transient noise models.

18. The method of claim 13, where the step of attenuating the repetitive transient noise comprises limiting a transient noise correction to a value less than or equal to an average value in response to a detection of a vowel or another harmonic structure.

19. The method of claim 13, further comprising:

setting a threshold frequency above or below which signals are evaluated for repetitive transient noise; and updating the threshold frequency over time as the repetitive transient noise model learns frequencies of repetitive transient noises.

20. The method of claim 13, further comprising setting a threshold frequency above or below which signals are evaluated for repetitive transient noise based on a speed of a vehicle.

21. A system for attenuating repetitive transient noise, comprising:

a repetitive transient noise detector comprising a processor configured to determine whether a transient noise of an aural signal is repetitive based on a comparison between the aural signal and a repetitive transient noise model;

where the repetitive transient noise detector is configured to perform the comparison by fitting the repetitive transient noise model to the aural signal in a time-frequency domain, and where the repetitive transient noise detector is configured to identify the transient noise as being repetitive based on a correlation between a temporal shape of the aural signal and a temporal shape of the repetitive transient noise model, and a correlation between a spectral shape of the aural signal and a spectral shape of the repetitive transient noise model;

where the repetitive transient noise detector is configured to update the repetitive transient noise model based on one or more characteristics of the transient noise in response to an identification that the transient noise is repetitive; and a repetitive transient noise attenuator responsive to the repetitive transient noise detector and configured to generate a noise-reduced aural signal by attenuation of the transient noise identified in the aural signal as being repetitive.

* * * * *

UNITED STATES PATENT AND TRADEMARK OFFICE

CERTIFICATE OF CORRECTION

PATENT NO. : 8,326,621 B2
APPLICATION NO. : 13/307615
DATED : December 4, 2012
INVENTOR(S) : Phillip A. Hetherington et al.

It is certified that error appears in the above-identified patent and that said Letters Patent is hereby corrected as shown below:

In the Claims

In column 11, claim 13, line 30, after "and a temporal shape" delete "and spectral shapes".

Signed and Sealed this
Fourth Day of February, 2014

Michelle K. Lee

Michelle K. Lee
*Deputy Director of the United States Patent and Trademark Office*